US 8,570,517 B2

(12) United States Patent
Horita

(10) Patent No.: US 8,570,517 B2
(45) Date of Patent: Oct. 29, 2013

(54) COLORIMETRIC VALUE CALCULATING METHOD, PROFILE GENERATING METHOD, COLOR CONVERSION METHOD, COLOR CONVERSION APPARATUS, AND COMPUTER-READABLE RECORDING MEDIUM WITH COLOR CONVERSION PROGRAM RECORDED THEREIN

(75) Inventor: Shuhei Horita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 415 days.

(21) Appl. No.: 12/880,826

(22) Filed: Sep. 13, 2010

(65) Prior Publication Data

US 2011/0063618 A1 Mar. 17, 2011

(30) Foreign Application Priority Data

Sep. 14, 2009 (JP) ................................. 2009-212225

(51) Int. Cl.
G01J 3/46 (2006.01)
(52) U.S. Cl.
USPC ........................................................ 356/402

(58) Field of Classification Search
USPC ....................... 356/402; 358/1.9; 250/559.11
See application file for complete search history.

(56) References Cited

U.S. PATENT DOCUMENTS

| 5,991,046 A * | 11/1999 | Shakespeare et al. ........ 356/429 |
| 6,263,291 B1 * | 7/2001 | Shakespeare et al. .......... 702/85 |
| 2003/0058441 A1 * | 3/2003 | Shakespeare et al. ........ 356/319 |
| 2004/0021869 A1 * | 2/2004 | Shakespeare et al. ........ 356/429 |
| 2007/0058186 A1 | 3/2007 | Tanaka |
| 2009/0141265 A1 * | 6/2009 | Shakespeare et al. .......... 356/73 |

FOREIGN PATENT DOCUMENTS

| JP | 2003-298854 A | 10/2003 |
| JP | 2007-081586 A | 3/2007 |

* cited by examiner

Primary Examiner — Kara E Geisel
(74) Attorney, Agent, or Firm — Sughrue Mion, PLLC

(57) ABSTRACT

First spectral data (spectral transmittance) of a printed object, and second spectral data (spectral reflectance) of the printed object are obtained. Further, third spectral data (spectral radiance distribution) of a transmissive light source, and fourth spectral data (spectral radiance distribution) of a reflective light source are obtained. Then, using the first, second, third and fourth spectral data, colorimetric value data of the printed object in a given observational environment is calculated.

8 Claims, 12 Drawing Sheets

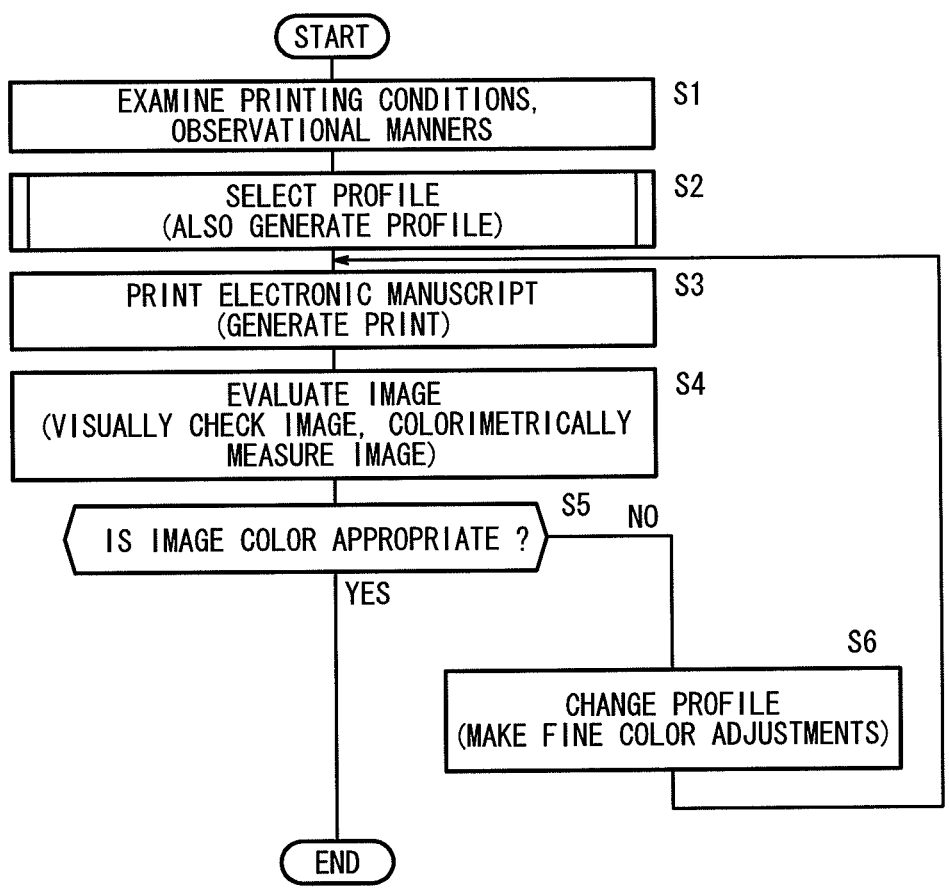

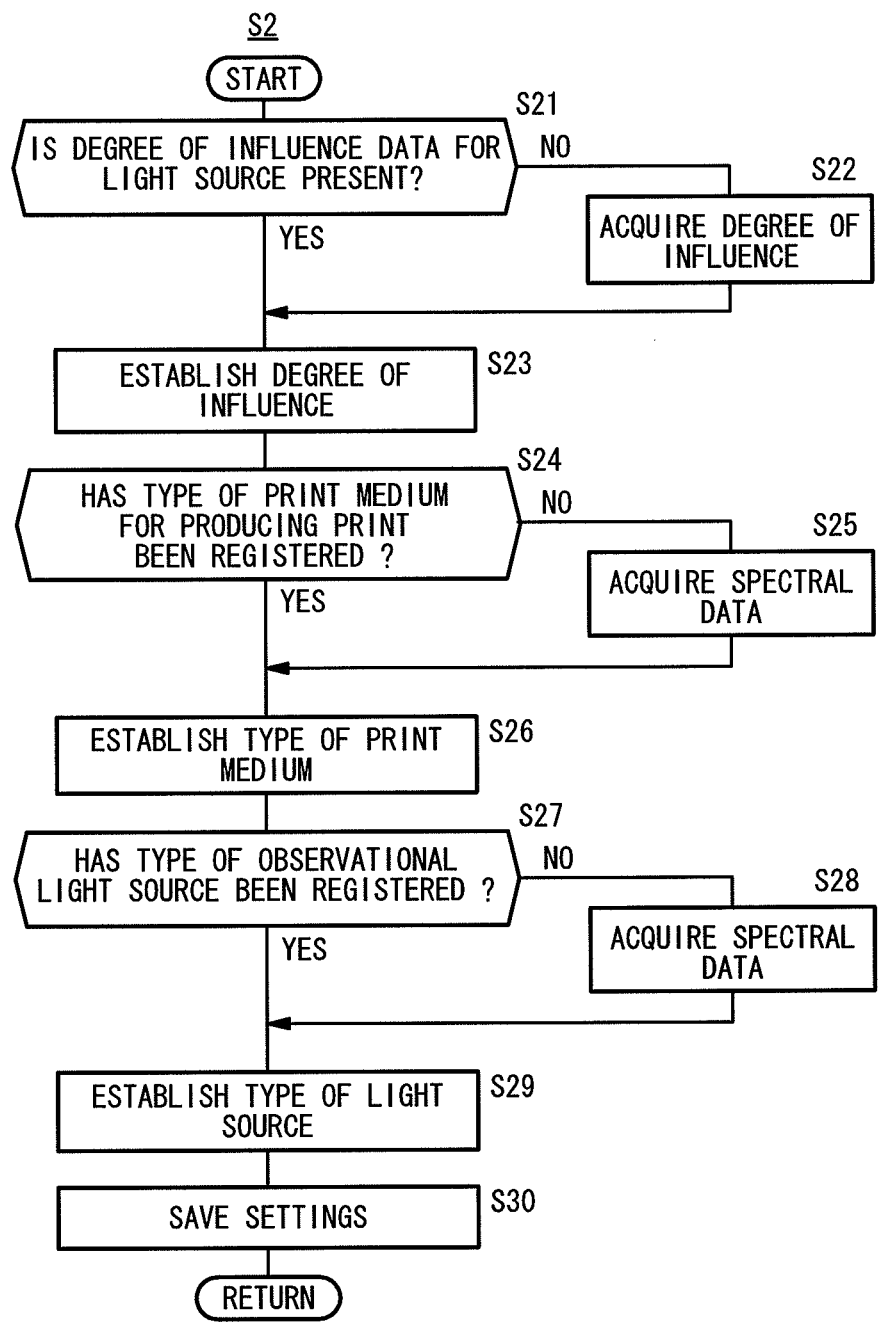

COLORIMETRIC VALUE CALCULATING METHOD, PROFILE GENERATING METHOD, COLOR CONVERSION METHOD, COLOR CONVERSION APPARATUS, AND COMPUTER-READABLE RECORDING MEDIUM WITH COLOR CONVERSION PROGRAM RECORDED THEREIN

CROSS-REFERENCE TO RELATED APPLICATION

This application is based upon and claims the benefit of priority from Japanese Patent Application No. 2009-212225 filed on Sep. 14, 2009, of which the contents are incorporated herein by reference.

BACKGROUND OF THE INVENTION

1. Field of the Invention

The present invention relates to a colorimetric value calculating method, a profile generating method, a color conversion method, a color conversion apparatus, and a computer-readable recording medium having a color conversion program recorded therein, in which, in an observational environment where both transmissive and reflective light sources coexist, colorimetric values of a print made up of an image formed on a light-transmissive medium are calculated.

2. Description of the Related Art

With significant advances in inkjet technology in recent years, it has been become possible for inkjet printers to produce large color prints of high quality at high speeds. Inkjet printers are not only popular for private or home use, but also are widely used in commercial applications nowadays. Inkjet printers enable prints to be made on POP (Point Of Purchase) posters, wall posters, large-size mediums such as outdoor advertisements and billboards, roll mediums, and thick hard mediums.

There are a wide variety of print mediums (hereinafter also referred to as "mediums") available for use in prints in order to meet various commercial demands. For example, such print mediums include paper mediums including synthetic paper, thick paper, aluminum-evaporated paper, etc., resin mediums made of vinyl chloride, PET, etc., and tarpaulin paper made of a woven fiber cloth with synthetic resin films applied to both surfaces thereof.

Since advertisement prints are expected to be effective in arousing consumers' motivation to buy advertised products through visual sensation, the finish of colors of the prints (printed mediums) is of particular importance. Heretofore, there have been disclosed various color matching technologies, such as a method of generating an ICC (International Color Consortium) profile, a method of adjusting a designated color, etc., as print color managing means.

Advertisement prints are displayed in a variety of places including outdoor areas, indoor areas, and spotlighted exhibition sites. Generally, the spectral characteristics (spectral energy distribution) of environmental light as an observational light source for prints vary depending on different places where the prints are displayed. As a result, in cases where the observational light sources differ, even though the same print is viewed, the spectral characteristics of light that ultimately reaches the retinal wall of eyes of the observer are different, and therefore, the appearance of the print (impression of colors) to the observer is subject to variation, although the tendency may differ from observer to observer. As a consequence, if the observational environment in which a print is produced (i.e., the location where the printer is installed) and the observational environment in which the print is displayed differ greatly from each other, then the print may possibly fail to exhibit desired colors.

As one method for solving such problems, Japanese Laid-Open Patent Publication No. 2007-081586 discloses a method and apparatus for storing independently spectral data of a print, and a plurality of light source spectral data. A profile appropriate for an observational light source is generated each time that the observational light source is set up. This publication states that the method and apparatus can generate profiles corresponding to respective different observational light sources for colorimetric measurement in a reduced number of man-hours, and can perform appropriate color management for prints depending on such observational light sources.

Further, in Japanese Laid-Open Patent Publication No. 2003-298854, as spectral data which is used when a profile is generated, in place of the spectral reflectance of the print, it is disclosed that the spectral transmittance of a film or the like can be used. (Refer to paragraph [0070] in the specification of Japanese Laid-Open Patent Publication No. 2003-298854.)

However, with a print consisting of an image formed on a light-transmissive medium, in the case of an observational environment in which both transmissive and reflective light sources coexist, or stated otherwise, in the event the print is displayed under the influence of both a transmissive light source and a reflective light source, problems occur in that colors of the print cannot be managed appropriately.

Moreover, the method and apparatus disclosed in Japanese Laid-Open Patent Publication No. 2007-081586 and Japanese Laid-Open Patent Publication No. 2003-298854 provide no consideration for a situation where an observational environment is provided in which both transmissive and reflective light sources coexist.

SUMMARY OF THE INVENTION

An object of the present invention is to provide a colorimetric value calculating method, a profile generating method, and a color conversion method, together with an apparatus and program therefor, which enable color management to be carried out appropriately for a print that is observed under the influence of both transmissive and reflective light sources.

The present invention concerns a colorimetric value calculating method for calculating a colorimetric value of a printed object including an image formed on a light-transmissive medium in an observational environment in which both a transmissive light source and a reflective light source coexist.

The above colorimetric value calculating method comprises a first acquisition step for acquiring a spectral transmittance of the printed object and a spectral reflectance of the printed object, a second acquisition step for acquiring a spectral distribution of the transmissive light source and a spectral distribution of the reflective light source, and a calculating step for calculating a colorimetric value of the printed object in the observational environment, using the obtained spectral transmittance of the printed object, the obtained spectral reflectance of the printed object, the obtained spectral distribution of the transmissive light source, and the obtained spectral distribution of the reflective light source.

Because it is configured in this manner, the aforementioned method is capable of generating an appropriate profile of the printed object when observed under the influence of both the transmissive light source and the reflective light source, whereby appropriate color management thereof can be carried out.

Further, preferably, the method further comprises a third acquisition step for acquiring a degree of influence of the transmissive light source and the reflective light source with respect to how the printed object is viewed, and the calculating step calculates the colorimetric value of the printed object in the observational environment further using the degree of influence.

The colorimetric value calculating method preferably further comprises an estimating step of estimating an optical material characteristic value of a protective film, a third acquiring step of acquiring a spectral transmittance of the protective film, a first predicting step of predicting a spectral transmittance of a protective-film-covered print, which is made up of the printed object covered by the protective film, using the spectral transmittance of the printed object and the obtained spectral transmittance of the protective film, and a second predicting step of predicting a spectral reflectance of the protective-film-covered print using the spectral reflectance of the printed object and the estimated optical material characteristic value of the protective film. In this case, the calculating step calculates a colorimetric value of the protective-film-covered print in the observational environment.

Further, preferably, the first acquisition step is performed using a measuring unit for measuring the light sources, or an acquiring unit for acquiring data from a database.

Further, preferably, the third acquisition step is performed using an acquiring unit for acquiring the degree of influence based on a setting by a user, or by using an acquiring means for acquiring the degree of influence by measuring the transmissive light source and the reflective light source.

The colorimetric value calculating method preferably further comprises an estimating step of estimating an optical material characteristic value of a protective film, a fourth acquiring step of acquiring a spectral transmittance of the protective film, a first predicting step of predicting a spectral transmittance of a protective-film-covered print, which is made up of the printed object covered by the protective film, using the spectral transmittance of the printed object and the obtained spectral transmittance of the protective film, and a second predicting step of predicting a spectral reflectance of the protective-film-covered print, using the spectral reflectance of the printed object and the estimated optical material characteristic value of the protective film. In this case, the calculating step calculates a colorimetric value of the protective-film-covered print in the observational environment.

The profile generating method according to the present invention comprises a first acquisition step of acquiring a spectral transmittance of a color chart serving as a printed object formed on a light-transmissive medium, a second acquisition step for acquiring a spectral distribution of a transmissive light source and a spectral distribution of a reflective light source, which act as observational light sources for the printed object, a calculating step for calculating a colorimetric value of the color chart in an observational environment in which the transmissive light source and the reflective light source coexist, using the obtained spectral transmittance of the color chart, the obtained spectral reflectance of the color chart, the obtained spectral distribution of the transmissive light source, and the obtained spectral distribution of the reflective light source, and a generating step of generating a print profile based on the calculated colorimetric value of the color chart.

The color conversion method according to the present invention comprises a first acquisition step of acquiring a spectral transmittance and a spectral reflectance of a color chart serving as a printed object formed on a light-transmissive medium, a second acquisition step of acquiring a spectral distribution of a transmissive light source and a spectral distribution of a reflective light source, which act as observational light sources for the printed object, a calculating step for calculating a colorimetric value of the color chart in an observational environment in which the transmissive light source and the reflective light source coexist, using the obtained spectral transmittance of the color chart, the obtained spectral reflectance of the color chart, the obtained spectral distribution of the transmissive light source, and the obtained spectral distribution of the reflective light source, a generating step of generating a print profile based on the calculated colorimetric value of the color chart, and a color converting step of color converting image data showing an image to be printed, while using an arbitrary profile as an input profile and using the print profile generated by the generating step as an output profile.

Preferably, the color conversion method further comprises an input step of further color converting the color converted image data and supplying the same to a color calibration apparatus, while using the print profile as an input profile and using a profile of the color calibration apparatus as an output profile, and an adjusting step of adjusting a degree of influence of the transmissive light source and the reflective light source with respect to how the printed object is viewed, while referring to the image output from the color calibration apparatus.

The present invention also concerns a color conversion apparatus for performing color conversion on a printed object including an image formed on a light-transmissive medium in an observational environment in which both a transmissive light source and a reflective light source coexist.

The above color conversion apparatus comprises a first acquisition unit for acquiring a spectral transmittance of the printed object and a spectral reflectance of the printed object, a second acquisition unit for acquiring a spectral distribution of the transmissive light source and a spectral distribution of the reflective light source, a calculating unit for calculating a colorimetric value of the printed object in the observational environment, using the spectral transmittance of the printed object and the spectral reflectance of the printed object obtained from the first acquisition unit, together with the spectral distribution of the transmissive light source and the spectral distribution of the reflective light source obtained from the second acquisition unit, a profile generating unit for generating a print profile based on the colorimetric value of the printed object in the observational environment as calculated by the calculating unit, and a color converter for color converting image data showing the image to be printed, while using an arbitrary profile as an input profile, and using the print profile generated by the profile generating unit as an output profile.

In a computer-readable recording medium according to the present invention, which records therein a color conversion program for enabling a computer to carry out color conversion on a printed object including an image formed on a light-transmissive medium in an observational environment in which both a transmissive light source and a reflective light source coexist, the program further enables the computer to function as means for acquiring a spectral transmittance of the printed object and a spectral reflectance of the printed object, means for acquiring a spectral distribution of the transmissive light source and a spectral distribution of the reflective light source, means for calculating a colorimetric value of the printed object in the observational environment, using the spectral transmittance of the printed object, the spectral reflectance of the printed object, the spectral distribution of the transmissive light source, and the spectral distribution of the reflective light source, means for generating a print profile based on the calculated colorimetric value of the printed object in the observational environment, and means for color converting image data to be displayed in an image to be printed, while using an arbitrary profile as an input profile, and using the generated print profile as an output profile.

In accordance with the colorimetric value calculating method, the profile generating method, the color conversion method, the color conversion apparatus, and the computer-readable recording medium having the color conversion program recorded therein of the present invention, a spectral transmittance of the printed object and a spectral reflectance of the printed object are obtained, and in addition, a spectral distribution of the transmissive light source and a spectral distribution of the reflective light source are obtained, whereupon a colorimetric value of the printed object is calculated under a given observational environment utilizing the spectral transmittance of the printed object, the spectral reflectance of the printed object, the spectral distribution of the transmissive light source, and the spectral distribution of the reflective light source. Therefore, the invention is capable of generating an appropriate profile for the printed object, which is to be viewed under the influence of both a transmissive light source and a reflective light source, and whereby color management can be carried out appropriately for the printed object.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a flowchart of a sequence for obtaining an appropriate color print using the printing system according to the present embodiment;

FIG. 8 is a flowchart of a profile generating method according to the present embodiment;

DESCRIPTION OF THE PREFERRED EMBODIMENTS

A colorimetric value calculating method, a profile generating method, and a color conversion method according to a first embodiment of the present invention, in relation to a color conversion apparatus and a printing system that carry out the same, will be described in detail below with reference to the accompanying drawings.

Figure 1:
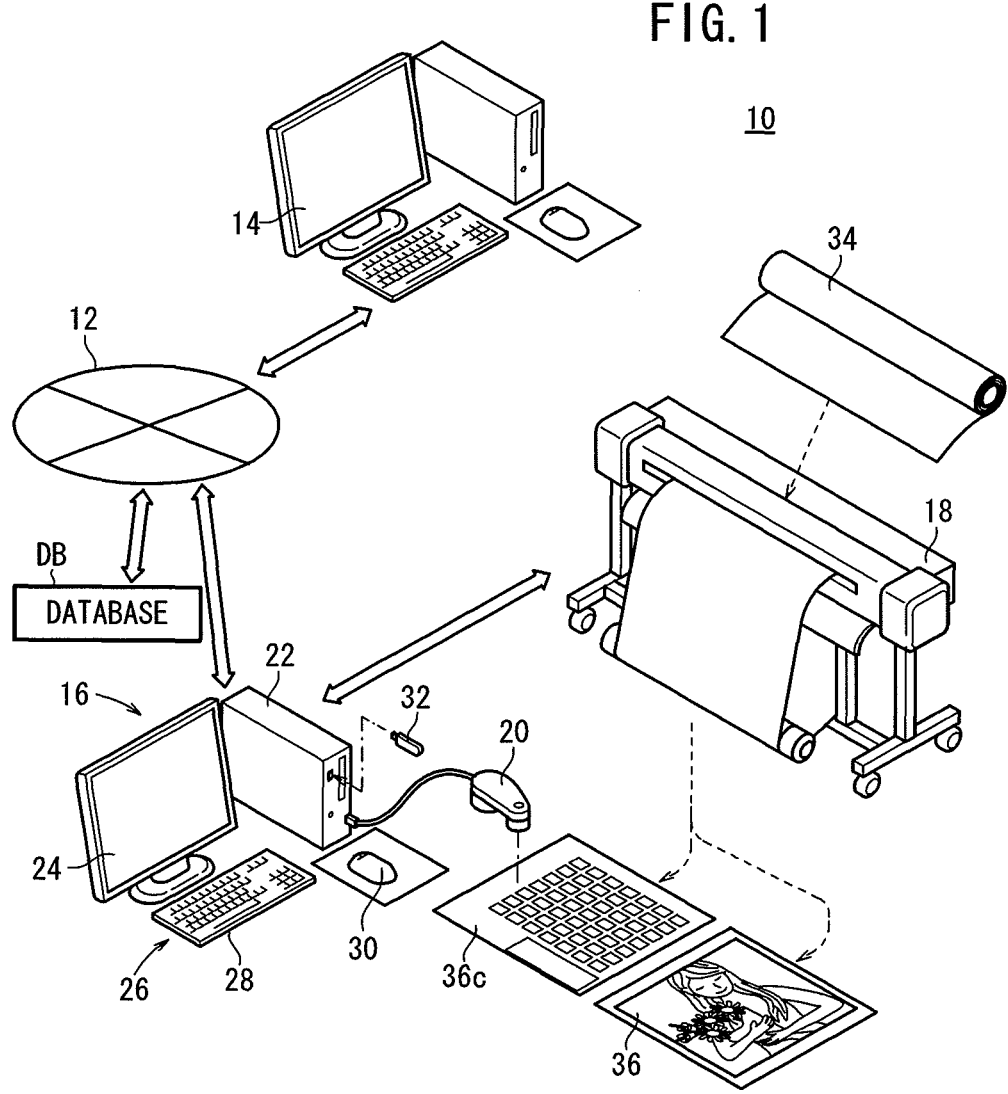
FIG. 1 is a perspective view of a printing system incorporating a color conversion apparatus according to an embodiment of the present invention.

FIG. 1 shows in perspective a printing system 10 incorporating an image processing apparatus 16 as a color conversion apparatus according to an embodiment of the present invention.

As shown in FIG. 1, the printing system 10 basically comprises a LAN 12, an editing apparatus 14, the image processing apparatus 16 serving as a colorimetric value calculating apparatus, a printing machine 18, and a colorimeter 20 serving as a first acquisition unit.

The LAN 12 is a network constructed according to communication standards such as Ethernet (registered trademark) or the like. The editing apparatus 14, the image processing apparatus 16, and a database DB are connected to each other over the LAN 12 by a wired or wireless link.

The editing apparatus 14 is capable of editing an arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels consisting of four colors (C, M, Y, K) or three colors (R, G, B).

PDL refers to a language that is descriptive of image information, including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems Incorporated, and XPS (XML Paper Specification).

A color scanner, not shown, is connected to the editing apparatus 14. The color scanner is capable of optically reading a color original, which is set in position. Therefore, the editing apparatus 14 can acquire color image data in the form of an electronic manuscript from the color scanner based on the color original read thereby.

The image processing apparatus 16 converts the color image data of an electronic manuscript described by PDL into bitmap image data (a type of raster image data), and then performs a desired image processing process, e.g., a color conversion process, an image scaling process, an image arranging process, etc., on the bitmap image data, converts the processed bitmap image data into a print control signal that matches the printing process of the printing machine 18, and sends the print control signal to the printing machine 18.

The image processing apparatus 16 comprises a main unit 22 including a CPU, a memory, etc., a display device 24 for displaying color images, and an input device 26 as an input unit including a keyboard 28 and a mouse 30. A portable memory 32, which is capable of freely recording and erasing electronic data, and the colorimeter 20 are connected to the image processing apparatus 16.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls propulsion of inks onto a print medium 34 (a rolled non-printed medium as shown in FIG. 1) based on print control signals received from an external apparatus, e.g., the image processing apparatus 16, in order to print a color image on the print medium 34, thereby producing a printed object 36, which may include a color chart 36c.

The print medium 34 may comprise a paper medium such as synthetic paper, thick paper, aluminum-evaporated paper or the like, a resin medium such as vinyl chloride, PET or the like, or tarpaulin paper or the like.

The colorimeter 20 measures colorimetric values of an object to be measured. Colorimetric values refer not only to tristimulus values X, Y, Z, the coordinates L*, a*, b* of a uniform color space, etc., but also to a distribution of optical material characteristic values (hereinafter referred to as "spectral data") with respect to wavelengths, e.g., a spectral radiance distribution (spectral distribution), a spectral sensitivity distribution, spectral reflectance, or spectral transmittance.

The printed object 36, which is obtained in this manner, is displayed in a location under a transmissive light source TS and a reflective light source RS, which serve as observational light sources.

Figure 2:
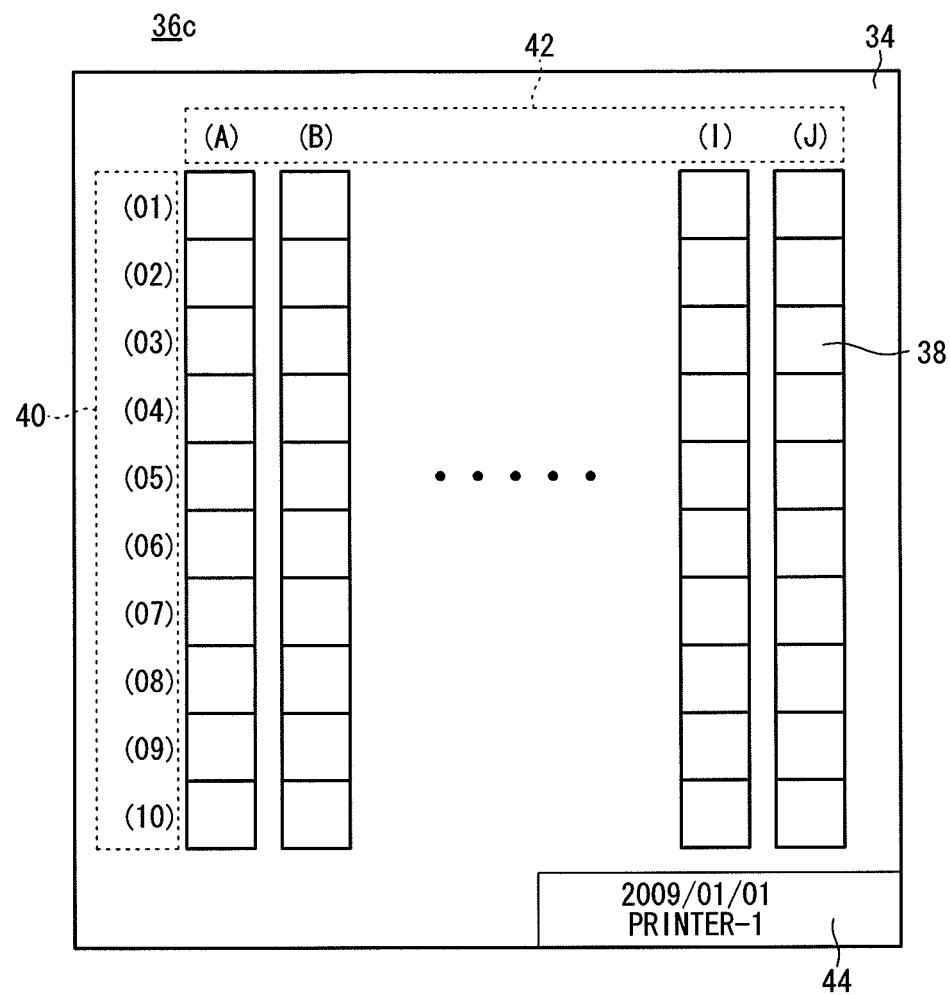
FIG. 2 is a front elevational view of a color chart according to the present embodiment.

FIG. 2 is a front elevational view of the color chart 36c according to the present embodiment.

The color chart 36c shown in FIG. 2 comprises one hundred color patches 38 of different colors, which are substantially identical in shape and arranged in rows and columns, a sequence of numbers 40 and a sequence of alphabetical letters 42 for identifying positions of the color patches 38 along directions of the rows and columns, and print information 44 for identifying conditions for printing the color chart 36c, all of which is printed on the print medium 34.

The color patches 38 are arranged in a matrix having 10 vertical columns and 10 horizontal rows, the vertical columns of the color patches 38 being spaced from each other by given intervals. Colors of the respective color patches 38 are set to given values within a range of signal levels of C, M, Y, K values (a percentage range from 0% to 100% or an 8-bit gradation range from 0 to 255).

The sequence of numbers 40 represents a vertical string of characters ranging from (01) to (10) positioned in alignment with and to the left of respective rows of color patches 38. The sequence of alphabetical letters 42 represents a horizontal string of characters ranging from (A) to (J) positioned in alignment with and at the top of respective columns of color patches 38.

The print information 44 is printed on the print medium 34 and represents the type and serial number, or a registered name of the printing machine 18, a print mode (to be described later), the type of print medium 34, a print date, etc.

Figure 3:
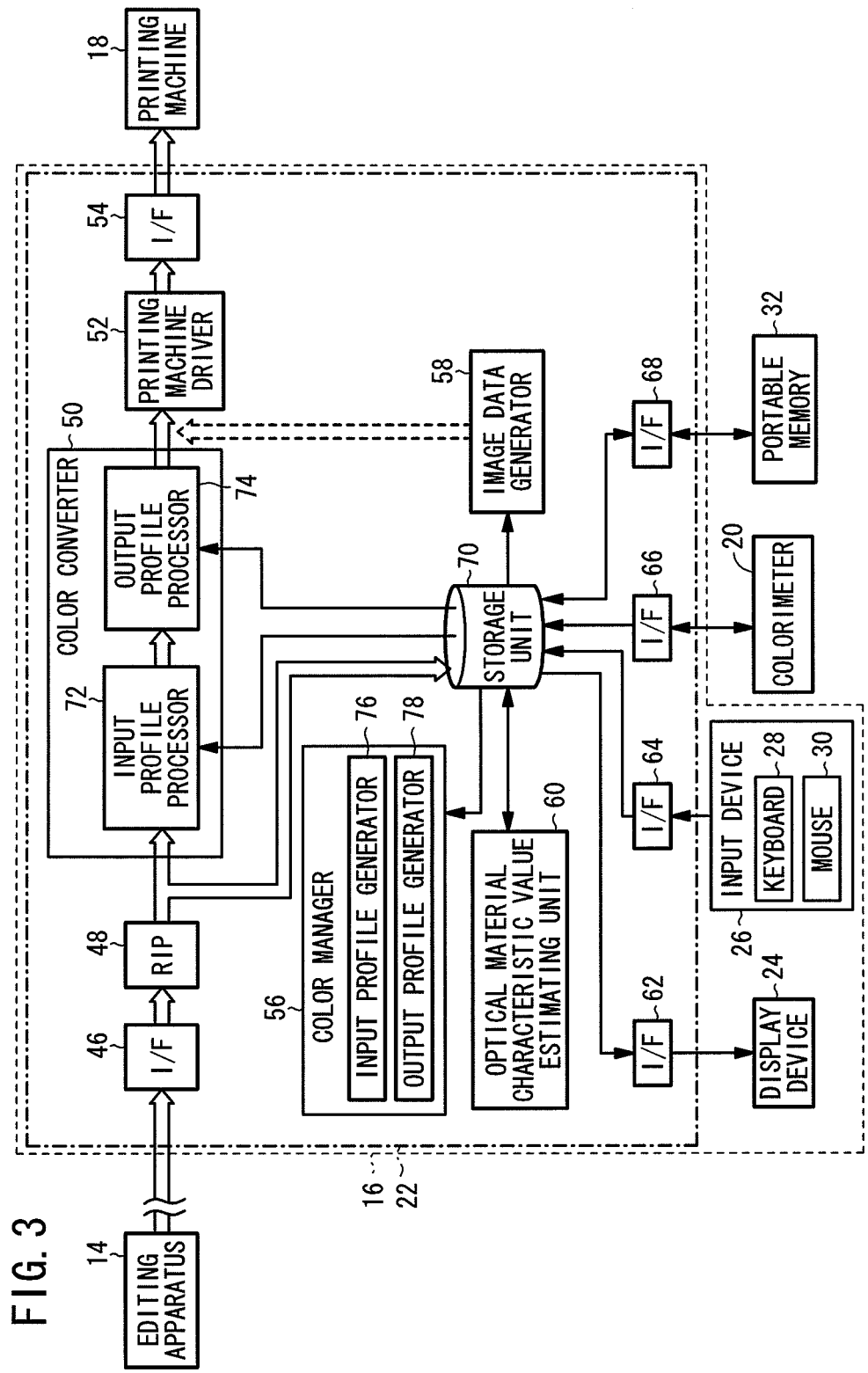
FIG. 3 is a functional block diagram of an image processing apparatus according to the present embodiment.

FIG. 3 is a functional block diagram of the image processing apparatus 16 according to the present embodiment. In FIG. 3, an electronic manuscript is supplied along directions indicated by the outlined solid-line arrows, image data for the color chart 36c is supplied along directions indicated by the outlined broken-line arrows, and various other data is supplied along directions indicated by the solid-line arrows.

As shown in FIG. 3, the main unit 22 of the image processing apparatus 16 includes an I/F 46 for entering an electronic manuscript supplied from the editing apparatus 14, a RIP (Raster Imaging Processor) 48 for converting the PDL format of the electronic manuscript supplied from the I/F 46 into a raster format, a color converter 50 for performing a color conversion process on the converted C, M, Y, K values (or R, G, B values) of the electronic manuscript from the RIP 48 in order to produce image data of new C, M, Y, K values, a printing machine driver 52 for converting the image data of the new C, M, Y, K values produced by the color converter 50 into print control signals (ink propulsion control data) that match the printing process of the printing machine 18, and another I/F 54 for outputting the print control signals generated by the printing machine driver 52 to the printing machine 18.

The main unit 22 also includes a color manager 56 for managing profiles for different printing machines 18, an image data generator 58 for generating image data to print the color chart 36c, an optical material characteristic value-estimating unit 60 for estimating optical material characteristic values of a later-mentioned laminate film, an I/F 62 connected to the display device 24, an I/F 64 connected to the input device 26 including the keyboard 28 and the mouse 30, an I/F 66 connected to the colorimeter 20, and an I/F 68 connected to the portable memory 32.

The main unit 22 also includes a storage unit 70 for storing various data supplied from various components in the interior of the main unit 22, and for supplying the stored data to various components of the main unit 22. The storage unit 70 is connected to the RIP 48, the color converter 50, the color manager 56, the image data generator 58, the optical material characteristic value-estimating unit 60, the I/F 62, the I/F 64, the I/F 66, and the I/F 68.

The color converter 50 comprises an input profile processor 72 for converting device-dependent data into device-independent data, and an output profile processor 74 for converting device-independent data into device-dependent data. Device-dependent data refer to data defined in terms of C, M, Y, K values, R, G, B values, or the like, for appropriately driving various devices. Device-independent data refer to data defined in terms of a display system, such as an HSV (Hue-Saturation-Value) system, an HLS (Hue-Lightness-Saturation) system, a CIELAB system, a CIELUV system, an X, Y, Z system, or the like.

The color manager 56 comprises an input profile generator 76 for generating input profiles for respective printing machines 18, and an output profile generator 78 (profile generator) for generating output profiles for respective printing machines 18.

The RIP 48 can perform various image processing processes, including an image scaling process depending on resolution, etc., of the printing machine 18, and a rotating and inverting process depending on a printing format utilized when an electronic manuscript is converted into a raster format.

From the C, M, Y, K values, the printing machine driver 52 generates ink propulsion control data corresponding to ink colors (C, M, Y, K, LC, LM, or W). The ink propulsion control data are related to operational details of the printing machine 18, which serve to eject the inks (ink ejection ON/OFF, ink dot diameters, etc.) according to data definitions inherent in the printing machine 18. In this process, the printing machine driver 52 has to convert from an 8-bit multiple-gradation image into a low-gradation image such as a binary image to generate the ink propulsion control data. For such a conversion, the printing machine driver 52 may use a known algorithm, such as a dither matrix method, an error diffusion method, or the like.

The input profile processor 72 or the output profile processor 74 is capable of correcting a profile depending on a print mode of the printing machine 18. The print mode refers to various print settings, such as the number of nozzles of the print head, the timing (unidirectional/bidirectional) of ink ejection during scanning of the print head, the number of passes, the number and type of inks used in the printing machine 18, and an algorithm for generating ink ejection control data, etc.

Furthermore, a controller (not shown) is provided, comprising a CPU, etc., for controlling all of the image processing processes described above. More specifically, the controller controls not only operation of various components of the main unit 22 (e.g., reading data from and writing data to the storage unit 70), but also transmission of display signals via the I/F 62 to the display device 24, and acquisition of colorimetric data from the colorimeter 20 via the I/F 66.

The image processing apparatus 16 according to the first embodiment is constructed as described above. Image processing processes or other functions described above can be performed according to application software (programs), which are stored in the storage unit 70, and which operate under the control of a basic program (operating system).

The aforementioned program is recorded in a computer readable recording medium (for example, the portable memory 32 shown in FIG. 1). The program, which is stored in the recording medium, may be read in and executed by a computer system. The term "computer system" as used herein may include an OS (operating system) or hardware embodied in peripheral devices or the like. Such a computer readable medium may be a portable storage device such as a flexible disk, magneto-optical disk, ROM, CD-ROM or the like, or a hard disk that is internal to the computer system. The computer readable medium may hold programs dynamically and for a short time period, as in the case of a transmission line, in which programs are transmitted to the computer over a communications circuit made up of an internet network, a telephone circuit line, or the like, and may include holding of programs for a certain length of time, as in the case of a volatile memory internal to a server/client type of computer system.

Figure 4:
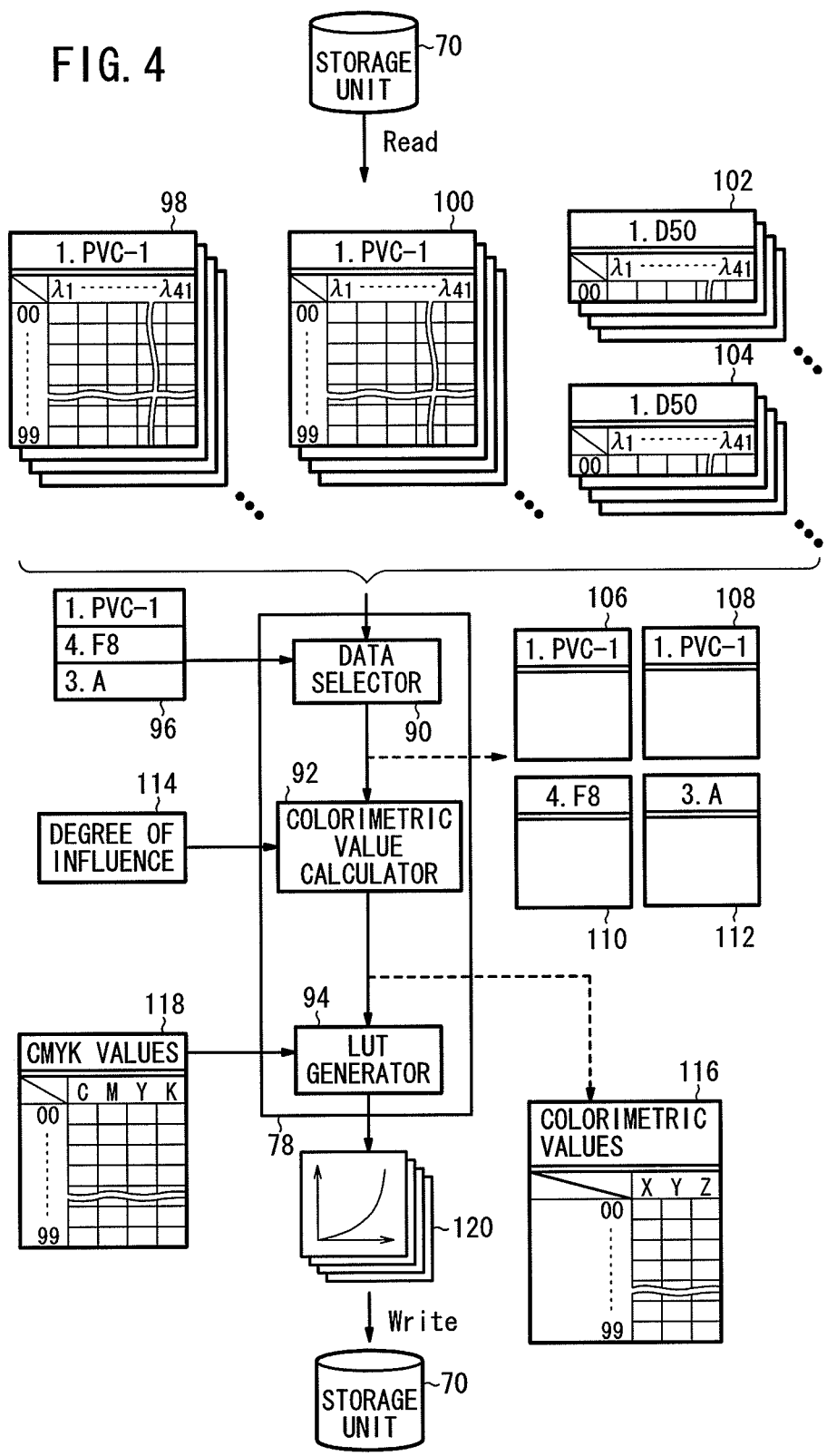
FIG. 4 is a functional block diagram of an output profile managing unit according to the present embodiment.

FIG. 4 is a functional block diagram of the output profile generator 78 according to the present embodiment.

The output profile generator 78 basically comprises a data selector 90, a colorimetric value calculator 92, and a LUT generator 94.

The data selector 90 selects spectral transmittance data of the medium 34 under profile generating conditions (hereinafter referred to as "first spectral data 106"), based on setting data 96, and a group 98 of spectral transmittance data of mediums, which are read out from the storage unit 70. The data selector 90 selects spectral reflectance data of the medium 34 under profile generating conditions (hereinafter referred to as "second spectral data 108"), based on setting data 96, and a group 100 of spectral reflectance data of mediums, which are read out from the storage unit 70. The data selector 90 also selects spectral radiance distribution data of the transmissive light source TS under profile generating conditions (hereinafter referred to as "third spectral data 110"), based on setting data 96, and a group 102 of spectral radiance distribution data of transmissive light sources, which are read out from the storage unit 70. The data selector 90 also selects spectral radiance distribution data of the reflective light source RS under profile generating conditions (hereinafter referred to as "fourth spectral data 112"), based on setting data 96, and a group 104 of spectral radiance distribution data of reflective light sources, which are read out from the storage unit 70. The setting data 96 are types of mediums 34, transmissive light sources TS, and reflective light sources RS that are set by the operator and which relate to the profile generating conditions.

The colorimetric value calculator 92 calculates colorimetric value data 116 under profile generating conditions, based on the first, second, third, and fourth spectral data 106, 108, 110, 112 selected by the data selector 90, and degree of influence data 114, which expresses a rate of contribution of the transmissive light source TS and the reflective light source RS with respect to how the printed object 36 is viewed.

The LUT generator 94 generates a LUT 120 under profile generating conditions based on the colorimetric value data 116 calculated by the colorimetric value calculator 92, and C, M, Y, K value data 118 corresponding to the respective color patches 38 (see FIG. 2).

In the present embodiment, spectral data are given respectively in association with one hundred color patches 38 whose patch numbers range from 0 to 99. The light wavelengths have forty-one data $\lambda_1$ through $\lambda_{41}$ associated therewith. For example, the light wavelengths are represented by $\lambda_1=400$ nm, ..., $\lambda_{41}=800$ nm at intervals of 10 nm.

FIGS. 5A through 5D are views showing by way of example setting screens for setting profile generating conditions according to the present embodiment.

Figure 5A:
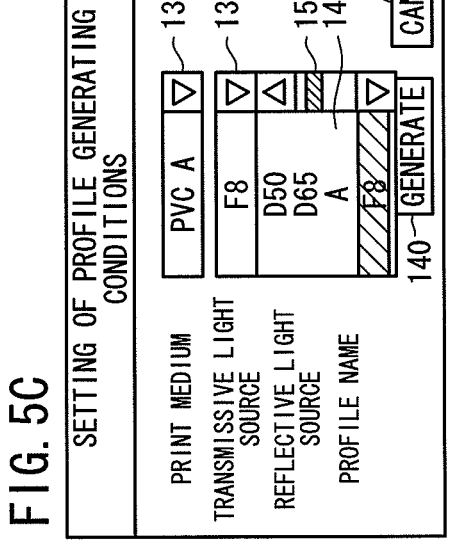
FIGS. 5A through 5D are views showing by way of example setting screens for setting profile generating conditions according to the present embodiment.

FIG. 5A shows a setting screen 130 having three pull-down menus 132, 134, 136, a textbox 138, and buttons 140, 142 labeled "GENERATE" and "CANCEL", respectively, arranged successively downward.

Figure 5B:
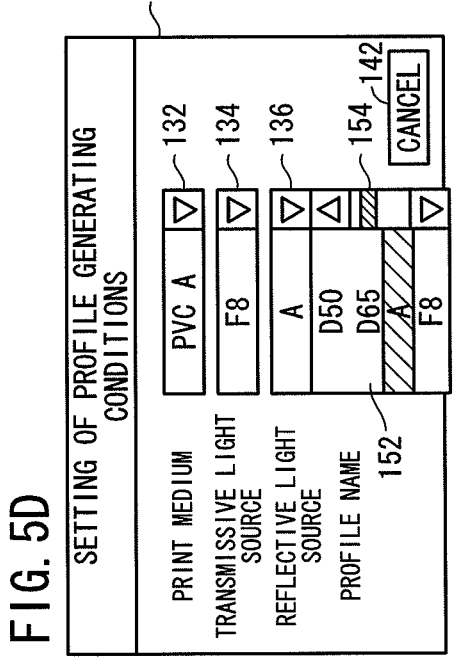

The setting screen 130 includes a string of letters indicating "MEDIUM" on the left side of the pull-down menu 132. When the operator operates the mouse 30 in a certain way, a selection column 144 also is displayed beneath the pull-down menu 132, as shown in FIG. 5B, with a scroll bar 146 added to the right side of the selection column 144.

Figure 5C:
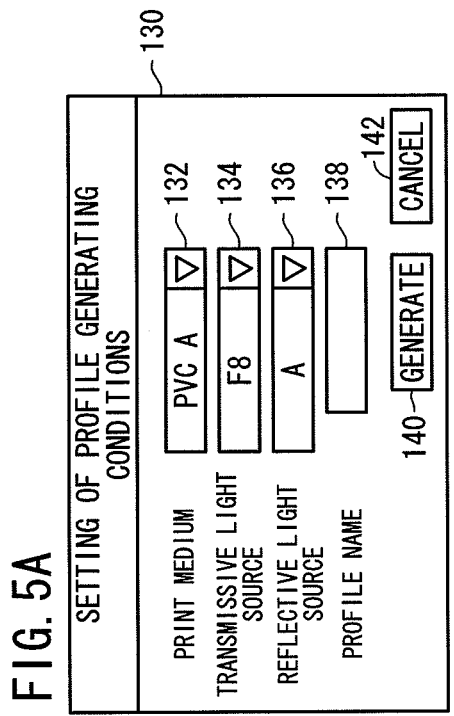

The setting screen 130 includes a string of letters indicating "TRANSMISSIVE LIGHT SOURCE" on the left side of the pull-down menu 134. When the operator operates the mouse 30 in a certain way, a selection column 148 also is displayed beneath the pull-down menu 134, as shown in FIG. 5C, with a scroll bar 150 added to the right side of the selection column 148.

Figure 5D:
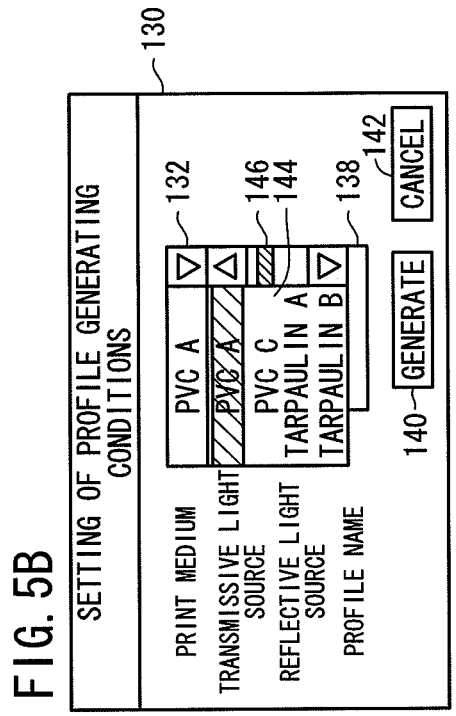

The setting screen 130 includes a string of letters indicating "REFLECTIVE LIGHT SOURCE" on the left side of the pull-down menu 136. When the operator operates the mouse 30 in a certain way, a selection column 152 also is displayed beneath the pull-down menu 136, as shown in FIG. 5D, with a scroll bar 154 added to the right side of the selection column 152.

The setting screen 130 includes a string of letters indicating "PROFILE NAME" on the left side of the textbox 138. The operator can enter character information into the textbox 138 through operation of the keyboard 28.

Figure 6:
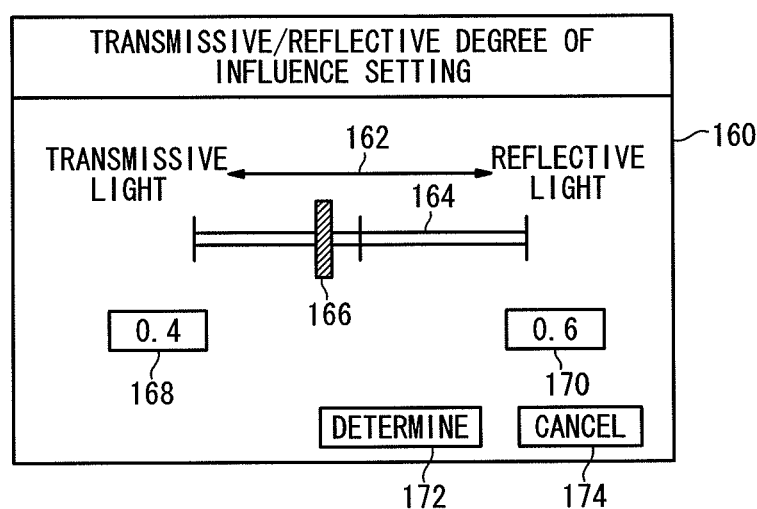
FIG. 6 is a view showing by way of example a setting screen for setting profile generating conditions according to the present embodiment.

FIG. 6 is a view showing by way of example a setting screen for setting profile generating conditions according to the present embodiment.

A setting screen 160 has an arrow symbol 162, a gauge 164, a slider 166, two textboxes 168, 170, and buttons 172, 174 labeled "DETERMINE" and "CANCEL", respectively, arranged successively downward.

The arrow symbol 162 extends in right and left directions of the setting screen 160, the lefthand side thereof indicating "transmissive light", and the righthand side thereof indicating "reflective light". The gauge 164 also extends in right and left directions of the setting screen 160, and is provided with the slider 166, which is movable in left and right directions over the gauge 164.

Beneath the lefthand end of the gauge 164, the textbox 168 is provided in which numerical values can be entered, and in which, for example, the number "0.4" is displayed. Beneath the righthand end of the gauge 164, the textbox 170 is provided in which numerical values can be entered, and in which, for example, the number "0.6" is displayed.

The printing system 10 according to the present embodiment basically is constructed as described above. Operations of the printing system 10 will be described below.

FIG. 7 is a flowchart of a sequence for producing a printed object 36 having appropriate colors, by using the printing system 10 according to the present embodiment. A process for producing the printed object 36 will be described below, mainly with reference to FIG. 1.

First, the operator examines printing conditions and observational manners of a printed object 36 to be produced (step S1). Such printing conditions refer to the type of printing machine 18 that is used to produce the printed object 36, the type of print medium 34, and the print mode referred to above, etc. Observational manners refer to a spectral radiation distribution of the transmissive light source TS or the reflective light source RS, and the manner in which the printed object 36 is displayed (reflection, transmission, or a combination thereof).

Then, the operator selects a profile suitable for the printing machine 18 (step S2). Normally, an input profile or an output profile is stored in the storage unit 70 of the main unit 22. If a profile suitable for the printing machine 18 has not been registered, i.e., is not stored in the storage unit 70, then an output profile can be generated separately.

Next, an electronic manuscript is printed using the printing machine 18, whereby a printed object 36 is obtained (step S3). A lamination process may be carried out on the printed object 36 using a non-illustrated laminating apparatus, whereby a protective film can be applied to an image-formed surface of the printed object 36. If this is done, the produced printed object 36 has an increased level of abrasion resistance and toughness.

Then, the operator evaluates the colors in the color image of the printed object 36 (step S4), and determines whether or not the colors in the color image are appropriate (step S5). The operator may evaluate colors of the color image in order to determine whether desired hues are obtained, for example, either by visually checking the color image based on observation of an overall or partial appearance of the color image, or by acquiring a colorimetric value of a certain area of the printed object 36 with the colorimeter 20, and determining whether or not the obtained colorimetric value falls within a desired range.

If, as a result of such image evaluation, the operator judges that the color of the color image of the printed object 36 is not suitable, then the operator changes the profile in order to make fine adjustments to the colors of the color image (step S6). More specifically, as detailed methods therefor, the operator may reset or regenerate the profile, may make fine adjustments to the profile (i.e., correct the presently set profile), or may make corrections to the print data of the printed manuscript.

Thereafter, an electronic manuscript is printed and colors of the color image itself are evaluated repeatedly (steps S3 through S6) until a printed object 36 having desired colors is obtained.

An image processing sequence carried out by the image processing apparatus 16 for printing an electronic manuscript (step S3) will be described in detail below with reference to FIG. 3.

When an electronic manuscript in PDL format supplied from the editing apparatus 14 is input to the image processing apparatus 16 via the LAN 12 and the I/F 46, the electronic manuscript is converted into 8-bit C, M, Y, K raster data (device-dependent image data) by the RIP 48. Such 8-bit C, M, Y, K raster data are then converted into X, Y, Z data (device-independent image data) by the input profile processor 72. Such X, Y, Z data are then converted into C, M, Y, K value data (device-dependent image data) by the output profile processor 74. The C, M, Y, K value data are then converted into a print signal (ink ejection control data) by the printing machine driver 52. The print signal is supplied to the printing machine 18 from the printing machine driver 52 via the I/F 54. Thereafter, the printing machine 18 produces a desired printed object 36 based on the print signal. Raster data, which is converted by the RIP 48, may be stored temporarily in the storage unit 70, as necessary.

Since input profiles and output profiles corresponding to a plurality of set conditions have been stored in the storage unit 70, an input profile and an output profile are supplied selectively to the input profile processor 72 and the output profile processor 74, depending on various preset conditions. If such profiles are appropriately corrected in view of the print mode of the printing machine 18, then more appropriate color conversion processes can be performed.

The flowchart shown in FIG. 7, for producing a printed object 36 having appropriate colors with the printing system 10 according to the present embodiment, has been described above. Next, a process for generating a profile (step S2) will be described in detail below with reference to the flowchart shown in FIG. 8.

First, the operator confirms whether or not there exists degree of influence data 114 of the light source (step S21). If degree of influence data 114 is not present, the degree of influence of the light source under observation is obtained (step S22). As stated previously, the degree of influence expresses a rate of contribution of the transmissive light source TS and the reflective light source RS with respect to how the printed object 36 is viewed. For example, among the radiant light from each of the light sources, a ratio of the light intensity therefrom that actually reaches the retina of a human observer via the printed object 36 corresponds to such a "degree of influence".

Figure 9A:
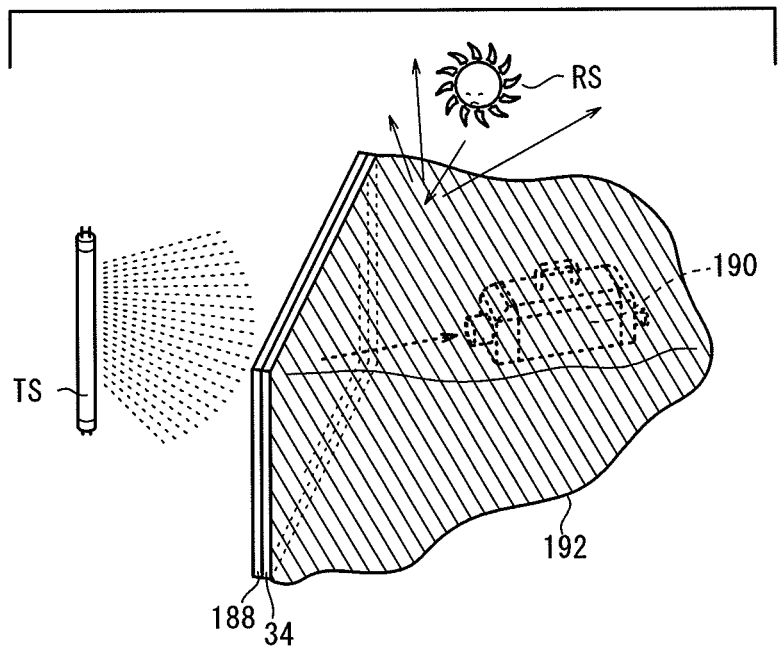
FIG. 9A is a perspective view for explaining a method used to measure the luminance of a transmissive light source.

FIG. 9A is a perspective view for explaining a method used to measure the luminance Lt of the transmissive light source TS under observation. First, an unprinted medium 34 is arranged in a display location, which has been determined beforehand, for the printed object 36. On the back surface side of the unprinted medium 34, a flat diffusion plate 188 is affixed tightly. The back surface is defined as a surface that is opposite from the observed surface (front surface) in the event that the image is formed on the medium 34.

On the other hand, on the front surface side of the medium 34, a spectral emission luminosity meter 190 (second acquisition unit) is disposed, such that the medium 34, the diffusion plate 188, and the transmissive light source TS are arranged on the optical axis of the spectral emission luminosity meter 190. Further, the spectral emission luminosity meter 190 is separated from the medium 34 by a given distance at which it is assumed the printed object 36 will be observed (e.g., at a general observation distance of 350 mm).

Furthermore, in order to block completely radiant light that is emitted toward the front surface side of the medium 34 from the reflective light source RS, a dark screen 192 is positioned so as to cover or shield the spectral emission luminosity meter 190 from the reflective light source RS.

Under such a positional relationship, the luminosity (cd/m$^2$) of the front surface side of the medium 34 is measured by the spectral emission luminosity meter 190. When done in this manner, under a condition in which the effect of the reflective light source RS is removed, the elemental luminosity Lt of the transmissive light source TS alone can be measured.

Figure 9B:
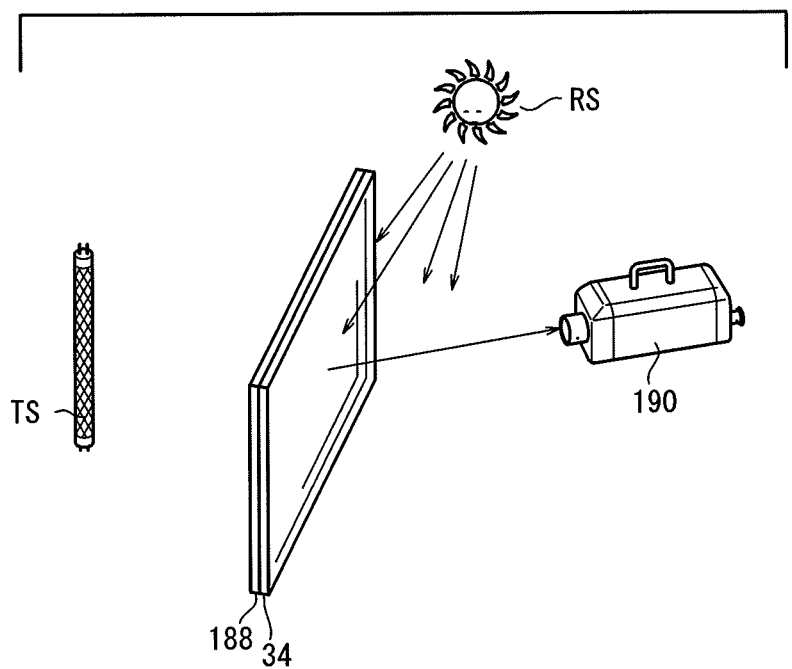
FIG. 9B is a perspective view for explaining a method used to measure the luminance of a reflective light source.

FIG. 9B is a perspective view for explaining a method used to measure the luminance Lr of the reflective light source RS under observation. In comparison to FIG. 9A, the positional relationship by which the medium 34, the diffusion plate 188, and the spectral emission luminosity meter 190 are placed in alignment is the same.

On the other hand, compared to FIG. 9A, the arrangement shown in FIG. 9B is different, in that the dark screen 192 has been removed, and the transmissive light source TS is turned off so as not to emit light.

Under such a positional relationship, the luminosity (cd/m$^2$) of the front surface side of the medium 34 is measured by the spectral emission luminosity meter 190. When done in this manner, under a condition in which the effect of the transmissive light source TS is removed, the elemental luminosity Lr of the reflective light source RS alone can be measured.

Thereafter, using the measured luminosities Lt and Lr, the degree of influence thereof can be determined. As a simplest and highly precise calculation method, as shown in equations (1) and (2) below, the degree of influence Ct, Cr can be calculated using the relative ratio of each luminosity.

$$Ct=Lt/(Lt+Lr) \quad (1)$$

$$Cr=Lr/(Lt+Lr) \quad (2)$$

As is self-evident from equations (1) and (2), because a relationship is established in which Ct+Cr=1, the values Ct and Cr are standardized values. Hereinbelow, according to the present embodiment, the rates of contribution Ct, Cr of the transmissive light source TS and the reflective light source RS, respectively, are utilized as degree of influence data 114.

After the degree of influence data 114 is acquired, the degree of influence is set by means of the setting screen 160 shown in FIG. 6. The numerical values displayed in the textboxes 168, 170 indicate the degree of influence Ct, Cr corresponding to the transmissive light source TS and the reflective light source RS, respectively.

For example, by a dragging operation of the mouse 30 (see FIG. 1), when the slider 166 is caused to move in left and right directions along the gauge 164, settings for the degree of influence are changed. At this time, the degree of influence is determined corresponding to the stopped position of the slider 166 on the gauge 164, and numerical values are displayed in the textboxes 168, 170.

Similarly, by operating the keyboard 28 (see FIG. 1), predetermined numerical values can be input into the textboxes 168, 170 to thereby set the degree of influence.

Then the operator presses the "DETERMINE" button 172 disposed at the bottom of the setting screen 160. Upon doing so, the input values in the textboxes 168, 170 are supplied to the main unit 22 as degree of influence data 114, and the values are stored in the storage unit 70. On the other hand, when the "CANCEL" button 174 is pressed, the setting screen closes and the setting operation is brought to an end.

In this manner, degree of influence data 114 of the light sources are set (step S23).

Next, the operator confirms whether or not the type of print medium 34 used for printing has been registered (step S24).

If not yet registered, spectral data of the printed object 36, which is produced by the print medium 34, is acquired (step S25). For example, the operator prepares the portable memory 32, which stores spectral data (spectral transmittance and spectral reflectance of the printed object 36 produced by the print medium 34) therein, and connects the portable memory 32 to the main unit 22 of the image processing apparatus 16. Spectral data stored in the portable memory 32 are automatically or manually transferred as new data to the storage unit 70. Alternatively, spectral data may be managed by the database DB (see FIG. 1) and, if necessary, acquired therefrom and transferred to the storage unit 70.

Further, alternatively, spectral data of the printed object 36 produced by the print medium 34 may be acquired directly using the colorimeter 20, which is connected to the main unit 22. A process of directly acquiring spectral data using the colorimeter 20 will be described below, mainly with reference to FIG. 3.

The operator enters a request to print the color chart 36c into a setting screen (not shown), which is displayed on the display device 24. In response to the request, the image data generator 58 of the main unit 22 generates image data (C, M, Y, K values) for printing the color chart 36c, and supplies the generated image data to the printing machine driver 52 from the path indicated by the outlined broken-line arrows. The printing machine driver 52 then converts the image data into a print signal, which is supplied to the printing machine 18 in the same manner as when an electronic manuscript is printed. In this manner, the color chart 36c (see FIG. 2) is printed.

The C, M, Y, K value data 118 (see FIG. 4), which correspond to pixels of the respective color patches 38, are stored in the storage unit 70 in advance, and are read from the storage unit 70 when image data is generated.

Using the colorimeter 20, which is connected to the image processing apparatus 16, the operator measures the spectral transmittance and the spectral reflectance of each of the color patches 38 of the color chart 36c (see FIG. 2). Preferably, the colorimeter 20 used for making such measurements is capable of measuring either one of spectral transmittance or spectral reflectance, simply by switching the measurement mode thereof.

Because the same color chart 36c is measured twice, as shown in FIG. 2, the order in which color measurements are made for each of the color patches 38 preferably is set beforehand, as a sequence for colorimetrically measuring the color patches 38, e.g., (01) through (10) on column (A) and (01) through (10) on column (B), using the numbers 40 and alphabetical letters 42 shown in FIG. 2.

Based on a notification that the operator has completed the colorimetric measurement, the spectral data corresponding to the color patches 38 are stored in the storage unit 70 via the I/F 66, in relation to the type of print medium 34 (see FIG. 3).

After spectral data have been saved in the storage unit 70, a new type of print medium 34 can be selected from the selection column 144 of the pull-down menu 132 shown in FIG. 5B. In FIG. 5B, "PVC A" (where "PVC" refers to polyvinyl chloride") is selected.

The type of print medium 34 is thus established (step S26).

The operator then confirms whether or not the types of observational light sources (transmissive light source TS and reflective light source RS) have been registered (step S27). If not yet registered, then spectral data of the light sources are acquired (step S28). As noted above, the portable memory 32 may store spectral data of the light sources (i.e., spectral radiation distributions of the transmissive light source TS and the reflective light source RS), and the operator may acquire such spectral data from the portable memory 32.

After the spectral data have been stored, a new type of transmissive light source TS can be selected from the selection column 148 of the pull-down menu 134 shown in FIG. 5C. In FIG. 5C, a light source "F8" is selected and set.

Further, a new type of reflective light source RS can be selected from the selection column 152 of the pull-down menu 136 shown in FIG. 5D. In FIG. 5D, a light source "A" is selected and set.

In this manner, types of observational light sources (transmissive light source TS and reflective light source RS) are established (step S29).

Finally, profile generating conditions, made up of the degree of influence Ct (=1−Cr) established in step S23, the type of print medium 34 established in step S26, and the types of light sources, i.e., the transmissive light source TS and the reflective light source RS, established in step S29 are saved (step S30).

After a profile name to be generated has been entered and registered in the textbox 138 shown in FIG. 5A, the operator presses the "GENERATE" button 140. Various settings (setting data 96) are now input through the I/F 64 to the main unit 22, whereupon such data are stored automatically in the storage unit 70.

Thereafter, as shown in FIG. 4, the first, second, third and fourth spectral data 106, 108, 110, 112, which are associated with the setting data 96, are selected by the data selector 90, from among the setting data 96 supplied from the storage unit 70, the group 98 of spectral transmittance data of print mediums, the group 100 of spectral reflectance data of print mediums, the group 102 of spectral radiation distribution data of the transmissive light sources, and the group 104 of spectral radiation distribution data of the reflective light sources. It goes without saying that the first spectral data 106 and the second spectral data 108 should be selected as the same type of print medium 34.

Then, the colorimetric value calculator 92 calculates colorimetric value data 116 under profile generating conditions, based on the first, second, third, and fourth spectral data 106, 108, 110, 112, along with the degree of influence data 114.

The colorimetric value data 116 under profile generating conditions are tristimulus values X, Y, Z calculated based on actual measured data, for a case in which the printed object 36 is observed under an environment where the transmissive light source TS and the reflective light source RS coexist.

Tristimulus values of the color patches 38 under the transmissive light source TS are defined by (Xt, Yt, Zt). The tristimulus values (Xt, Yt, Zt) correspond to values, which are produced by multiplying the spectral radiation distribution of the transmissive light source TS, the spectral transmittance of the printed object 36, and a color matching function, and integrating the product within a range of visible wavelengths.

Tristimulus values of the color patches 38 under the reflective light source RS are defined by (Xr, Yr, Zr). The tristimulus values (Xr, Yr, Zr) correspond to values, which are produced by multiplying the spectral radiation distribution of the reflective light source RS, the spectral transmittance of the printed object 36, and a color matching function, and integrating the product within a range of visible wavelengths.

The tristimulus values (X, Y, Z) of each of the color patches 38 under such a mixed lighting environment are calculated using the degree of influence Ct according to the following equations (3) to (5):

$$X = Ct \cdot Xt + (1-Ct) \cdot Xr \quad (3)$$

$$Y = Ct \cdot Yt + (1-Ct) \cdot Yr \quad (4)$$

$$Z = Ct \cdot Zt + (1-Ct) \cdot Zr \quad (5)$$

According to the present embodiment, one hundred individual color patches 38 are measured respectively, so that one hundred sets of X, Y, Z values are obtained.

The LUT generator 94 generates the lookup table LUT 120 for converting the three-dimensional output profile data (X, Y, Z) into four-dimensional data (C, M, Y, K), based on an association between the one hundred sets of colorimetric value data 116 (X, Y, Z) and one hundred sets of C, M, Y, K value data 118.

With the above arrangement, output profiles corresponding to each of profile generating conditions are stored beforehand in the storage unit 70, so that when a print request for an electronic manuscript is made, a structure is adopted in which the output profiles are read out selectively corresponding to setting conditions. Accordingly, it is unnecessary to regenerate output profiles that have already been generated once, and thus the computational time required for image processing can be shortened.

Alternatively, a configuration may also be adopted in which, each time that a printing request for an electronic manuscript is made, an output profile is generated corresponding to the setting conditions for the print, and the output profile is supplied to the color converter 50. If done in this manner, the amount of data stored in the storage unit 70 can be reduced.

In the above manner, as indicated by step S2 in FIG. 7, profiles for the printing machine 18 can be generated. In particular, color reproduction accuracy can be further enhanced as a result of generating profiles while taking into consideration the following three points.

1. Prediction of Spectral Reflectance of Printed Object After Being Covered with a Protective Film In the case that a laminate film 200 (see FIG. 10) is applied as a protective layer to an image-formed surface of the printed object 36, the appearance of the color image changes to such a degree that it cannot be ignored, depending on the presence or absence of such a laminate film 200. Below, a printed object that is formed in this manner shall be referred to as a "protective-film-covered print".

In the case that strict color reproduction is to be carried out with respect to such a protective-film-covered print, printing of a color chart 36c with respect to the total combination of the printed object 36 and the laminate film 200, a lamination process, and colorimetric measurements thereof must all be performed, thus posing a troublesome burden.

On the other hand, the spectral transmittance of a protective-film-covered print can be predicted comparatively easily and with high precision according to a so-called multiplicative rule for spectral transmittance, i.e., by multiplying together the spectral transmittance of the printed object 36 and the spectral transmittance of the laminate film 200.

However, for spectral reflectance, because there are cases in which a similar type of multiplicative rule cannot be established, the spectral reflectance of the protective-film-covered print cannot easily be predicted. Thus, it is desirable to accurately predict the spectral reflectance of the protective-film-covered print using a known Kubelka-Munk theoretical model.

More specifically, based on the following equation (6), the spectral reflectance R of the protective-film-covered print is predicted. Although it is understood that each of the variables is a function of optical wavelength, for purposes of simplification, explanations of such functions, which are well known in the art, have been omitted.

$$R = [(R_g - R_\infty)/R_\infty - R_\infty(R_g - 1/R_\infty)\exp\{Sx(1/R_\infty - R_\infty)\}] / [(R_g - R_\infty) - (R_g - 1/R_\infty)\exp\{Sx(1/R_\infty - R_\infty)\}] \quad (6)$$

In the above equation (6), "$R_g$" represents the spectral reflectance (second spectral data 108) of the printed object 36 alone, "$R_\infty$" represents the specific spectral reflectance of the laminate film 200, "S" represents a scattering coefficient per unit thickness of the laminate film 200, and "x" represents the actual thickness of the laminate film 200.

Next, a method shall be explained in detail for estimating experimentally the unknown variables for $R_\infty$ (specific reflectance) and Sx (scattering coefficient), which are optical physical values of the laminate film 200.

Figure 10:
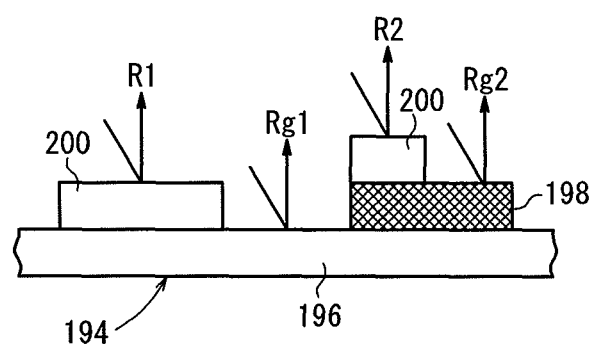
FIG. 10 is an outline view in cross section of a measurement specimen made for the purpose of estimating optical material property values of a protective film.

FIG. 10 is an outline view in cross section of a measurement specimen 194, made for the purpose of estimating optical material property values of the laminate film 200.

The measurement specimen 194 comprises a substrate 196 having a spectral reflectance of $Rg_1$ made up from a white non-transparent body, a black material 198, and the laminate film 200, which serves as an object to be measured.

An operator, using the colorimeter 20, measures the spectral reflectance of each location on the measurement specimen 194. As a result, measurement values are obtained of the spectral reflectance $R_1$ when the laminate film 200 is applied to cover the substrate 196, the spectral reflectance $Rg_2$ when the black material 198 is disposed on the substrate 196, and the spectral reflectance $R_2$ ($R_1 > R_2$) when the substrate 196 is covered by the laminate film 200 with the black material 198 intervening therebetween.

These measurement values are stored initially in the storage unit 70 via the I/F 66 provided in the main unit 22 of the image processing apparatus 16. Thereafter, the measurement values are supplied to the optical material characteristic value-estimating unit 60, in which a computational process is carried out according to the following equations (7) and (8).

The specific reflectance $R_\infty$ of the laminate film 200 is calculated by mathematical analysis, as follows:

$$R_\infty = \{C - \sqrt{(C^2 - 4)}\}/2 \quad (7)$$

where $$C = \{(R_1 + Rg_2)(R_2 \cdot Rg_1 - 1) - (R_2 + Rg_1)(R_1 \cdot Rg_2 - 1)\} / (R_2 \cdot Rg_1 - R_1 \cdot Rg_2) \quad (8)$$

In the case that $R_1 < R_2$, the subscripts 1 and 2 in the above equation (8) are reversed. The specific reflectance $R_\infty$ is a reflectance for a case in which it is assumed that the thickness of the test specimen is unlimited.

Next, using the actual measured value $R_n$ (n=1 or 2), the actual measured value $Rg_n$ (n=1 or 2), and $R_\infty$ as calculated by equation (5), the scattering coefficient S and the thickness x of the laminate film 200 are calculated as follows by equation (9), $$S \cdot x = \ln [\{(R_\infty - Rg_n)(1/R_\infty - R_n)\} / \{(R_\infty - R_n)(1/R_\infty - Rg_n)\}] / (1/R_\infty - R_\infty) \quad (9)$$

where S is the scattering coefficient per unit thickness, and x is the actual thickness of the laminate film 200. Concerning the definition of the scattering coefficient, although for purposes of simplification Sx (=S·x) has been defined as a scattering coefficient (i.e., as one variable) at a given film thickness x, either S or Sx may be used. Further, the same holds true as well for the absorption coefficient K.

Moreover, the following relationship, shown by equation (10), exists between the specific reflectance $R_\infty$, the scattering coefficient S, and the absorption coefficient K.

$$K/S = (1 - R_\infty)^2 / 2R_\infty \quad (10)$$

Therefore, the absorption coefficient K (or Kx) may be used instead of either the specific reflectance $R_\infty$ or the scattering coefficient S (or Sx). In other words, from among these three optical material characteristic values, once any two of them has been determined, the value of the other one can be determined uniquely.

Furthermore, using the compensation formula of Saunderson, and so on, the Kubelka-Munk model may be applied on the basis of a compensated value of the actually measured spectral reflectance $R_n$. See, "Calculation of the Color of Pigmented Plastics", JOURNAL OF THE OPTICAL SOCIETY OF AMERICA, volume 32, pp. 727-736 (1942). By means of such compensation, light reflection at the interface between the laminate film 200 and the exterior is taken into consideration, so that the spectral reflectance of the protective-film-covered print can be predicted with even greater accuracy.

In the foregoing manner, using the optical material characteristic values of the laminate film 200, the spectral transmittance and spectral reflectance of a protective-film-covered print can be predicted with good accuracy.

2. Color Conversion Processing Based on Consideration of Changes in Spectral Sensitivity Distribution Color conversion in accordance with a normal ICC profile is premised on color matching performed under a standard light source (D50). Accordingly, while referring to an average spectral sensitivity distribution of an observer under a D50 light source, a color matching function is determined, and tristimulus values X, Y, Z are calculated based on the determined color matching function.

However, because the spectral sensitivity distribution of the observer changes corresponding to the surrounding environmental light, as a result, even if the main light source is the same, a phenomenon (so called color adaptation) occurs such that the appearance of the colors tends to change. In particular, with a transmissive image in a dark location and a reflective image in a bright location, because the difference in the surrounding environmental light is large, there is a fear that suitable color matching cannot be realized. Thus, it is desirable for color conversion processing to be carried out while taking into consideration such changes in spectral sensitivity.

Figure 11:
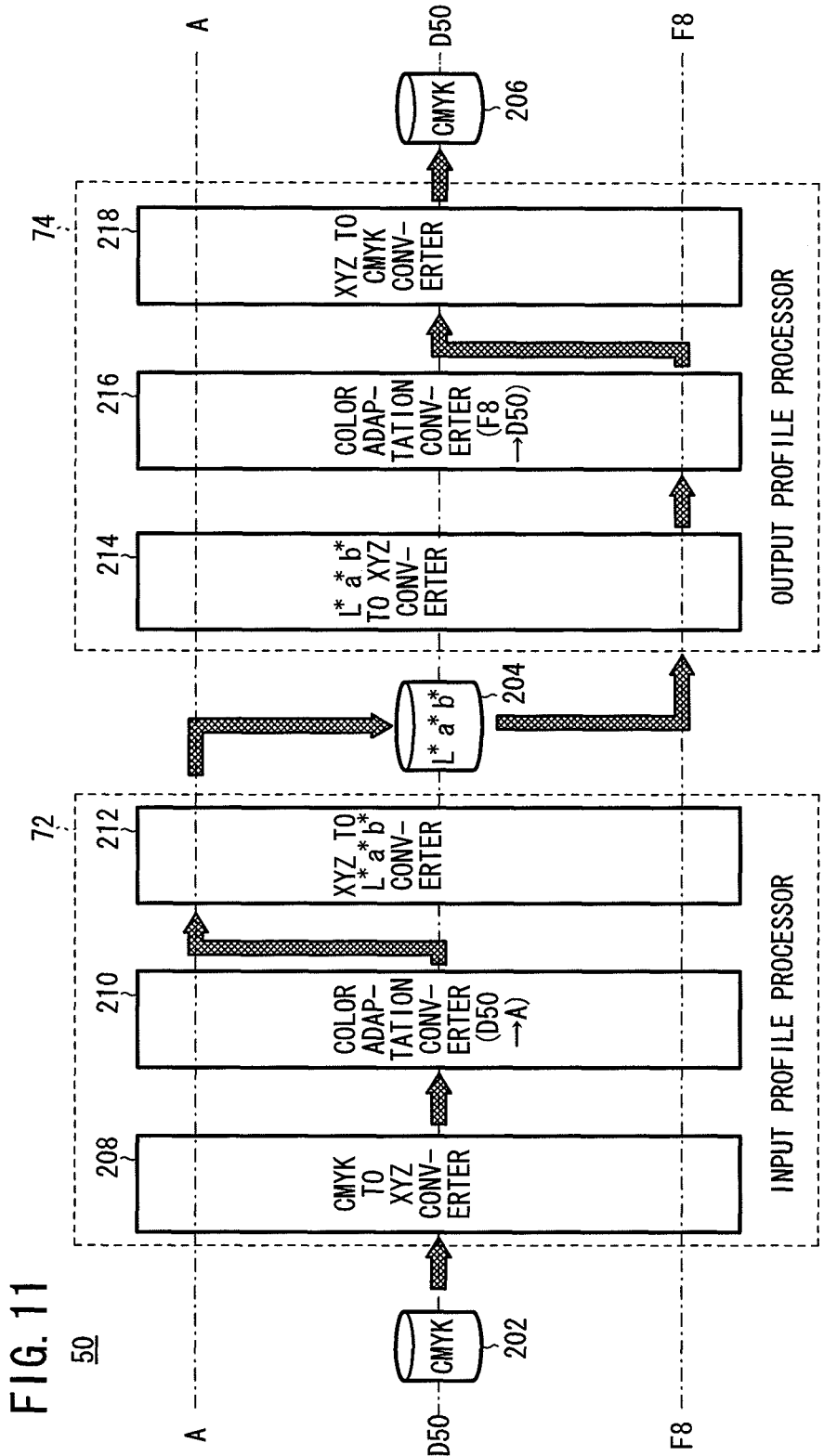
FIG. 11 is a detailed functional block diagram of a color converter in which changes in spectral sensitivity distribution are taken into consideration.

FIG. 11 is a detailed functional block diagram of a color converter 50 in which changes in spectral sensitivity distribution are taken into consideration. Each of the labels "A", "D50", and "F8" shown on the left and right edges of the drawing indicates attributes of the spectral sensitivity distribution (color matching function) corresponding to each of image data on which the various types of conversion processing are implemented.

C, M, Y, K value data 202 are converted into L*, a*, value data 204 by the input profile processor 72. The L*, a*, b* value data then are converted into C, M, Y, K value data 206 by the output profile processor 74. Below, an explanation shall be made for a case in which the C, M, Y, K value data 202 under an A light source, and the C, M, Y, K value data 206 under an F8 light source make up appropriate image data.

First, the C, M, Y, K (CMYK) value data 202 are converted once into X, Y, Z (XYZ) value data corresponding to the light source D50 by a CMYK to XYZ converter 208. As stated above, color conversion according to an ICC profile is premised on color matching performed under a D50 light source.

Next, by means of a color adaptation converter 210, the X, Y, Z value data corresponding to the light source D50 are converted into X, Y, Z value data corresponding to the light source A. Such color adaptation conversion can be performed using various conversion models. For example, Von-Kries conversion may be used, or a color adaptation matrix, which is stored in the profile, may be used.

Next, X, Y, Z (XYZ) value data corresponding to the light source A are converted into the L*, a*, b* (L*a*b*) value data 204 by an XYZ to L*a*b* converter 212. Such L*, a*, b* value data 204 are data in a color perception space that does not depend on the device or the observational light source. For example, a CIECAM97s or a CIECAM02 model may be used to produce such data.

Next, the L*, a*, b* value data 204 are converted into X, Y, Z value data corresponding to the light source F8 by an L*a*b* to XYZ converter 214, and further, by means of a color adaptation converter 216, the X, Y, Z value data corresponding to the light source F8 are converted once into X, Y, Z value data corresponding to the light source D50, in accordance with the same reasoning as discussed previously.

Lastly, X, Y, Z (XYZ) value data corresponding to the light source D50 are converted into C, M, Y, K (CMYK) value data 206 by an XYZ to CMYK converter 218. Such C, M, Y, K value data 206 define C, M, Y, K value data for obtaining a printed object 36 that exhibits appropriate colors, for a case in which printing is performed by the printing machine 18 and the printed object 36 is observed under an F8 light source.

In the foregoing manner, color conversion processing can be carried out while taking into consideration changes in the spectral sensitivity distribution, so that appropriate color matching can be realized even in cases where the surrounding environmental lights are different (e.g., a transmissive image in a dark location and a reflective image in a bright location).

3. Print Color Predictive Simulation Using Color Calibration Apparatus

As one example for determining the degree of influence of the transmissive light source TS and the reflective light source RS, there was disclosed above the method for measuring respectively the luminance Lt and the luminance Lr of the transmissive light source TS and the reflective light source RS (see FIGS. 9A and 9B). However, there may be cases in which measurement data of the luminance Lt and the luminance Lr are not available, or in which further fine adjustments are desirable with respect to an obtained degree of influence Ct.

Consequently, a print color calibration system 300 can be constructed, in which, without using the printing machine 18, the way in which colors of the printed object 36 are viewed is predicted when observed in an environment where both a transmissive light source TS and a reflective light source RS coexist, and an appropriate degree of influence of the light sources is determined.

Figure 12:
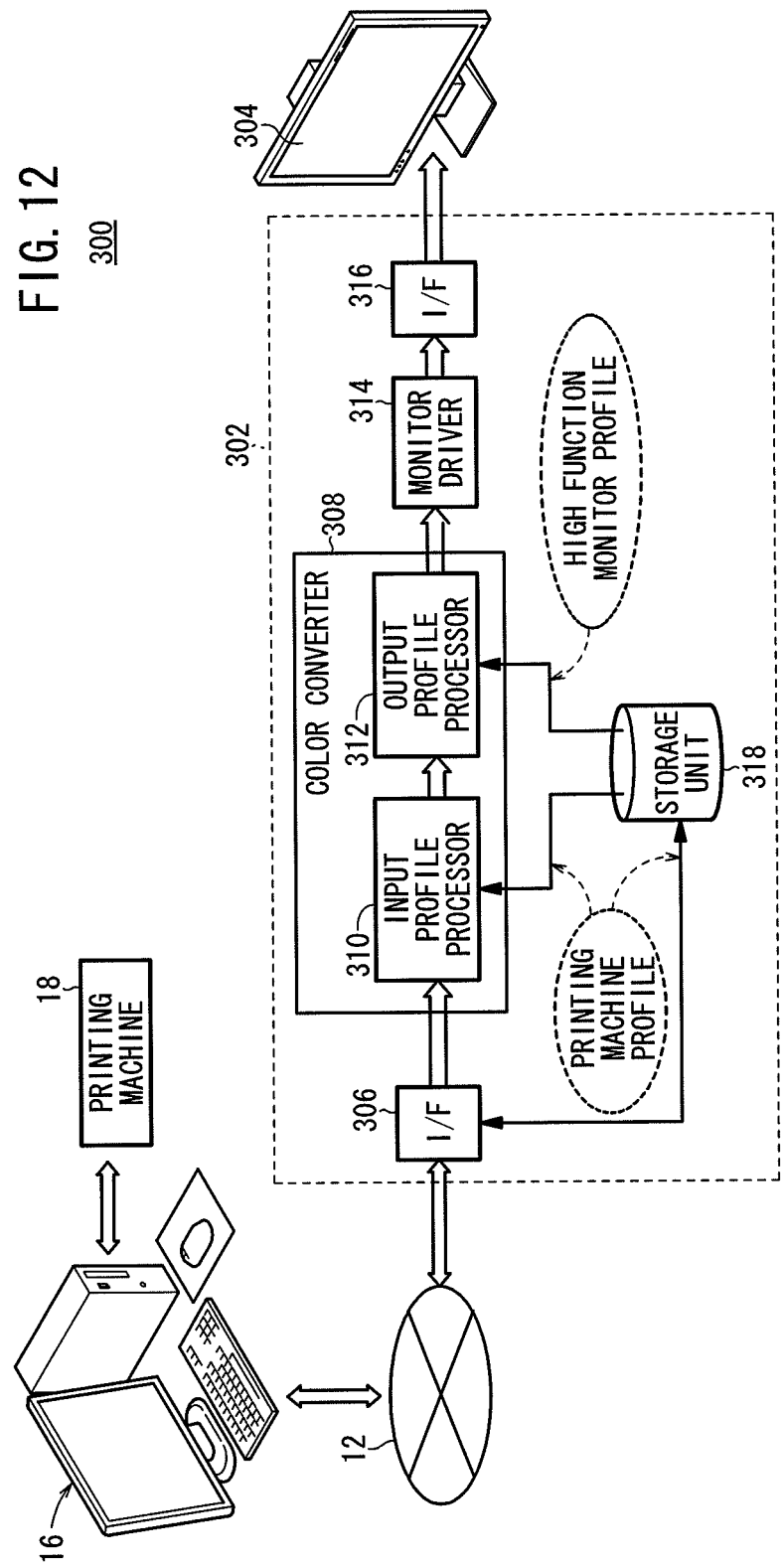
FIG. 12 is a perspective explanatory view of a print color calibration system in which a color calibration apparatus according to the present invention is incorporated.

FIG. 12 is a perspective explanatory view of a print color calibration system 300 in which a high function monitor 304 is incorporated as a color calibration device according to the present embodiment.

The print color calibration system 300 is constituted by a processing system or PC 302 equipped with imaging processing functions, and the high function monitor 304 that serves as a color calibration device.

The processing system 302 is connected to the LAN 12, so as to be connected mutually wirelessly or over wires with the image processing apparatus 16. The high function monitor 304 includes high definition display capabilities, such as high luminosity, a wide range gamut, and a high contrast ratio, etc., which are capable of reproducing substantially the gamut of the printing machine 18.

The processing system 302 comprises an I/F 306 to which an electronic manuscript supplied from the image processing apparatus 16 is input, a color converter 308 (including as sub-elements thereof an input profile processor 310 and an output profile processor 312), which implements a predetermined color conversion process with respect to the Y, M, C, K value data of the electronic manuscript supplied via the I/F 306 in order to acquire new R, G, B value data, a monitor driver 314 for converting the new R, G, B value image data, which have been color converted and acquired from the color converter 308, to display control signals suitable for the high function monitor 304, and an I/F 316 for transmitting the display control signals converted by the monitor driver 314 to the high function monitor 304.

Further, the processing system 302 is equipped with a storage unit 318 for storing an input profile and an output profile. The storage unit 318 supplies the input profile to the input profile processor 310, and also supplies the output profile to the output profile processor 312.

As shall be explained below, as a result of being constructed in the foregoing manner, a print color predictive simulation can be carried out using the high function monitor 304.

Image data converted by the output profile processor 74 shown in FIG. 3 (i.e., image data immediately before being supplied to the printing machine driver 52) is transmitted externally of the image processing apparatus 16 via a non-illustrated I/F. At this time, the print profile of the printing machine 18 is transmitted simultaneously therewith. Such data is supplied to the processing system 302 via the I/F 306 shown in FIG. 12.

Once the print profile for the printing machine 18 has been stored in the storage unit 318, and thereafter, an input profile and an output profile are supplied to the color converter 308. In the color converter 308, the print profile for the printing machine 18 is supplied to the input profile processor 310, whereas a display profile for the high function monitor 304 is supplied to the output profile processor 312.

On the other hand, C, M, Y, K raster format image data supplied via the I/F 306 are converted by the input profile processor 310 into L*, a*, b* coordinates, which then are converted by the output profile processor 312 into R, G, B values, and converted by the monitor driver 314 into display control signals, which are supplied to the high function monitor 304 via the I/F 316. Thereafter, the high function monitor 304 displays a desired reference image.

The operator confirms visually the color shading or hues of the reference image displayed on the high function monitor 304. When it is judged that the hues of the reference image are not suitable, the operator slides to the left or right the slider 166 of the setting screen 160 (see FIG. 6), which may be displayed on the display device 24 or on the high function monitor 304, thereby changing the value of the degree of influence data 114 (see FIG. 4).

In accordance with such a change in value, the print profile of the printing machine 18 and the image data (i.e., the image data immediately before being supplied to the printing machine driver 52) are changed, and a reference image is displayed rapidly on the high function monitor 304 in the same manner as discussed previously.

When performed in this manner, the operator can make fine adjustments to the degree of influence, while confirming visually the color shading or hues of the reference image. More specifically, using the high function monitor 304 serving as a color calibration apparatus, a predictive simulation of the print colors is carried out, so that an optimal degree of influence can be estimated. Since the reference image can be confirmed without requiring a printed object 36 to be obtained each time the degree of influence is changed, the print color calibration system 300 is both effective and economical.

Although a preferred embodiment of the present invention has been shown and described in detail, the invention is not limited by this embodiment, and various changes and modifications may be made thereto without departing from the scope of the invention as set forth in the appended claims.

For example, in the present embodiment, the color chart 36c has one hundred color patches 38, there are forty-one spectral data, and the light wavelengths are spaced at intervals of 10 nm. However, these numerical values may be changed freely, considering comprehensively features such as color reproduction accuracy, image processing time, etc.

Further, in the present embodiment, the printing machine 18 comprises an inkjet printing apparatus. However, the printing machine 18 is not limited to any particular type of apparatus, and the advantages and effects of the invention can be obtained with an electrophotographic apparatus, a thermosensitive apparatus, or the like.

What is claimed is:

1. A colorimetric value calculating method for calculating a colorimetric value of a printed object including an image formed on a light-transmissive medium in an observational environment in which both a transmissive light source and a reflective light source coexist, comprising:
   a first acquisition step for acquiring a spectral transmittance of the printed object and a spectral reflectance of the printed object;
   a second acquisition step for acquiring a spectral distribution of the transmissive light source and a spectral distribution of the reflective light source; and
   a calculating step for calculating the colorimetric value of the printed object in the observational environment, using the obtained spectral transmittance of the printed object, the obtained spectral reflectance of the printed object, the obtained spectral distribution of the transmissive light source, and the obtained spectral distribution of the reflective light source.

2. A colorimetric value calculating method according to claim 1, further comprising a third acquisition step for acquiring a degree of influence of the transmissive light source and the reflective light source with respect to how the printed object is viewed,
   wherein the calculating step calculates the colorimetric value of the printed object in the observational environment further using the degree of influence.

3. A colorimetric value calculating method according to claim 1, further comprising:
   an estimating step of estimating an optical material characteristic value of a protective film;
   a third acquiring step of acquiring a spectral transmittance of the protective film;
   a first predicting step of predicting a spectral transmittance of a protective-film-covered print, which is made up of the printed object covered by the protective film, using the spectral transmittance of the printed object and the obtained spectral transmittance of the protective film; and
   a second predicting step of predicting a spectral reflectance of the protective-film-covered print, using a spectral reflectance of the printed object and the estimated optical material characteristic value of the protective film,
   wherein the calculating step calculates a colorimetric value of the protective-film-covered print in the observational environment.

4. A colorimetric value calculating method according to claim 1, wherein the second acquisition step is performed using a measuring unit for measuring the light sources or an acquiring unit for acquiring data from a database.

5. A colorimetric value calculating method according to claim 2, wherein the third acquisition step is performed using an acquiring unit for acquiring the degree of influence based on a predetermined setting, or using an acquiring unit for acquiring the degree of influence by measuring the transmissive light source and the reflective light source.

6. A colorimetric value calculating method according to claim 2, further comprising:
   an estimating step of estimating an optical material characteristic value of a protective film;
   a fourth acquiring step of acquiring a spectral transmittance of the protective film;
   a first predicting step of predicting a spectral transmittance of a protective-film-covered print, which is made up of the printed object covered by the protective film, using the spectral transmittance of the printed object and the obtained spectral transmittance of the protective film; and
   a second predicting step of predicting a spectral reflectance of the protective-film-covered print, using a spectral reflectance of the printed object and the estimated optical material characteristic value of the protective film,
   wherein the calculating step calculates a colorimetric value of the protective-film-covered print in the observational environment.

7. A colorimetric value calculating method according to claim 1, said calculating of the colorimetric value further taking into account environmental observational aspects of the printed object including at least one of a light source of observational environment of the printed object and a manner of display of the printed object.

8. A colorimetric value calculating method according to claim 1, wherein the spectral reflectance and spectral transmittance are determined from a same side of the printed object.

* * * * *